No. 635,494. Patented Oct. 24, 1899.
D. H. LUDLOW.
EYEGLASSES AND SPECTACLES.
(Application filed June 25, 1897.)
(No Model.)
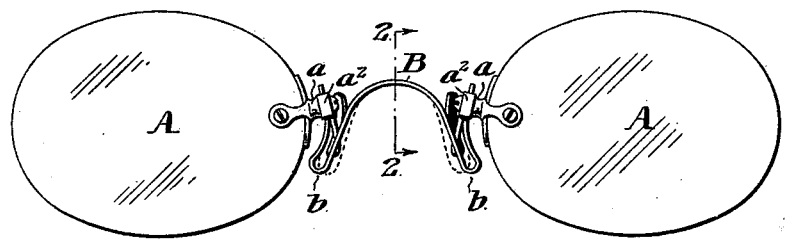
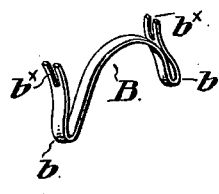
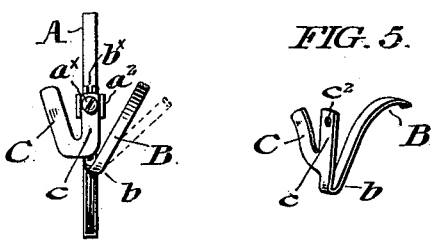
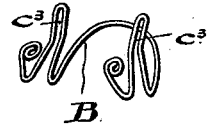
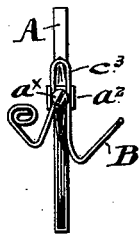
WITNESSES:
INVENTOR:
David Hunt Ludlow,
By his Attorneys,

UNITED STATES PATENT OFFICE.

DAVID HUNT LUDLOW, OF EASTON, PENNSYLVANIA.

EYEGLASSES AND SPECTACLES.

SPECIFICATION forming part of Letters Patent No. 635,494, dated October 24, 1899.

Application filed June 25, 1897. Serial No. 642,224. (No model.)

*To all whom it may concern:*

Be it known that I, DAVID HUNT LUDLOW, a citizen of the United States, residing in the city of Easton, in the county of Northampton and State of Pennsylvania, have invented certain new and useful Improvements in Eyeglasses and Spectacles, of which the following is a specification.

My invention relates to the class of eyeglasses and spectacles in which there is combined with nose rests a bridge which not only unites the lenses but is formed to rest and bear upon both the top and the sides of the nose of the wearer.

It is the object of the invention to so construct, and combine with the lenses, nose rests and a saddle bridge, as to distribute the pressure, and secure both such lateral and anterior support as will prevent the glasses from tipping forward or altering their position, and at the same time to effect ready adjustment to any nose and any inter-pupillary distance by bending or otherwise manipulating the material of the bridge.

Devices embodying my improvements are represented in the accompanying drawings and hereinafter described and claimed.

In the drawings,

Figure 1 is a front elevational view of a pair of eye glasses embodying my improvements, which, as stated, are of equal applicability to spectacles.

Figure 2 is a sectional view of the glasses represented in Figure 1, in the plane of the dotted line 2–2 of said figure, and sight being taken in the direction of the arrows applied to said line.

Figure 3 is a perspective detail of one of the nose rests represented in Figures 1 and 2, removed from its clamping post.

Figure 4 is a similar view of the bridge represented in said Figures 1 and 2, similarly removed from the posts.

Figure 5 is a fragmentary perspective detail of a typical embodiment of my invention in which both the bridge and nose rests are stamped out of a single piece of sheet metal.

Figure 6 is a view similar to Figure 2 of my invention as embodied in wire as opposed to sheet metal.

Figure 7 is a perspective view of the construction of bridge and nose rests represented in Figure 6.

Similar letters of reference indicate corresponding parts.

In the drawings,

A are the lenses, and *a* clasp-provided clamping posts which are typical of any such posts studs or other known means of attachment as are conveniently employed to connect and carry the lenses or lens frames.

B is the bridge of pliable or bendable material, of any suitable cross-section, or cross-sections, according to the preference of the manufacturer and the character of the material composing it.

The bridge is of the saddle type, that is to say, is conformed to rest upon or against and be conformed to both the top and the sides of the nose of the wearer,—as to the top of the nose by being bent and arched to conform to its curvature, and as to the sides by being prolonged or extended from the imaginary terminations of the arched portion proper at the desired inclination downward to a desired distance.

The lower portions of the bridge are then carried upwardly to terminal points of attachment to form, as represented in the drawings, two depending loops designated *b*.

Obviously, in the foregoing construction, in which the upturned or upwardly-extending outer portions of the loops occupy a plane either parallel with or slightly angular to the plane of the lenses, and the lateral inner connecting body-portions of said loops are extended upwardly and outwardly from the bight or bights of the loops so as to occupy an outward and upward angle with respect to the plane of the lenses, perfect adjustment to any form of nose and any inter-pupillary distance may be effected by bending the material which composes the bridge as an entirety, and particularly by bending that portion of the same which is constituted by the loops, to the desired form.

C are the nose rests, and *c* the offset arms of said nose rests which are adapted to be made either separate from the bridge as in the construction indicated in Figures 1, 2, and 3, or integral therewith as in the construction represented in Figures 5, 6, and 7.

In the construction represented in Figures 1, 2, and 3, attachment of both the bridge and the separate nose rests to the posts may be conveniently effected by the usual attaching screws $a^\times$ which secure said parts to the posts,—the offset arms of the nose rests being provided with screw apertures $c^\times$, and the free ends of the loops $b$ with longitudinally-extending slots $b^\times$ through which the screws pass.

In the construction shown in Figure 5, in which the outer portions of the bridge loops and the offset arms of the nose rests are so combined as to be composite of a single bar or piece of sheet metal out of which the entire device is struck, a single aperture $c^2$ in the upper end of said bar serves, through the application of the attaching screws, to secure the composite bridge and nose rests to the posts.

In the construction represented in Figures 6 and 7 in which the composite bridge and nose rests are formed integral with each other of a single piece of wire, and the offset arms of the nose rests and the outer portions of the neighboring loops are so extended as to form them into upwardly-projecting loop-eyes $c^3$, the attachment to the posts is effected by inserting the loop-eyes between the cheek pieces $a^2$ of the posts and clamping them in such position beneath the heads of the securing screws.

The advantages of my invention will be readily understood.

By the bending or manipulation of the metal of the loops,—in conjunction, of course, with the desired bending and adjustment of the nose rests,—the conformation of the bridge with respect to the nose of the wearer, and the set of the lenses, may be accurately adjusted,—that is to say, the lenses may be raised or lowered or moved in or out to insure the desired pupillary adjustment.

Having thus described my invention, I claim and desire to secure by Letters Patent—

1. In combination,—a pair of lenses,—clamping posts connected with said lenses,—a saddle bridge formed with depending loops the upwardly extending free extremities of which are connected with the clamping posts,—and the inner face of which from its crest to the bights of its loops is adapted to lie in unbroken continuous contact with the wearer's nose,—and nose rests, substantially as set forth.

2. In combination,—a pair of lenses,—clamping posts connected with said lenses,—a saddle bridge formed with depending loops, the upwardly extending free extremities of which are connected with said clamping posts and exist in a plane approximately coincident with that of the lenses, the body portion of which bridge lies in a plane forming an angle with that of the lenses,—and the inner face of which from its crest to the bights of its loops is adapted to lie in unbroken continuous contact with the nose of the wearer,—and nose rests,—substantially as set forth.

In testimony that I claim the foregoing as my invention I have hereunto signed my name this 19th day of June, A. D. 1897.

DAVID HUNT LUDLOW.

In presence of—
    J. BONSALL TAYLOR,
    F. NORMAN DIXON.